United States Patent
Ku et al.

(10) Patent No.: US 11,273,552 B2
(45) Date of Patent: Mar. 15, 2022

(54) METHOD AND SYSTEM FOR OBJECT GRASPING

(71) Applicant: Vicarious FPC, Inc., Union City, CA (US)

(72) Inventors: Li Yang Ku, Union City, CA (US); Nan Rong, Union City, CA (US); Bhaskara Mannar Marthi, Union City, CA (US)

(73) Assignee: Vicarious FPC, Inc., Union City, CA (US)

( * ) Notice: Subject to any disclaimer, the term of this patent is extended or adjusted under 35 U.S.C. 154(b) by 0 days.

(21) Appl. No.: 17/375,923

(22) Filed: Jul. 14, 2021

(65) Prior Publication Data

US 2022/0016767 A1 Jan. 20, 2022

Related U.S. Application Data

(60) Provisional application No. 63/171,701, filed on Apr. 7, 2021, provisional application No. 63/051,826, filed on Jul. 14, 2020, provisional application No. 63/051,870, filed on Jul. 14, 2020.

(51) Int. Cl.
*B25J 9/16* (2006.01)
*B25J 19/02* (2006.01)

(52) U.S. Cl.
CPC ............. *B25J 9/1612* (2013.01); *B25J 9/163* (2013.01); *B25J 9/1653* (2013.01); *B25J 9/1697* (2013.01); *B25J 9/161* (2013.01); *B25J 19/023* (2013.01)

(58) Field of Classification Search
CPC ........ B25J 9/1612; B25J 9/163; B25J 9/1653; B25J 9/1697; B25J 9/161; B25J 19/023
See application file for complete search history.

(56) References Cited

U.S. PATENT DOCUMENTS

| | | |
|---|---|---|
| 10,906,188 B1 | 2/2021 | Sun et al. |
| 2016/0101519 A1 | 4/2016 | Kopicki |
| 2018/0273297 A1 | 9/2018 | Wagner et al. |
| 2019/0248003 A1 | 8/2019 | Nagarajan et al. |
| 2019/0283249 A1 | 9/2019 | Komoda et al. |
| 2020/0094405 A1 | 3/2020 | Davidson et al. |
| 2020/0147798 A1 | 5/2020 | Toris et al. |
| 2020/0316782 A1 | 10/2020 | Chavez et al. |
| 2020/0331709 A1 | 10/2020 | Huang et al. |

(Continued)

FOREIGN PATENT DOCUMENTS

WO 2019097004 A1 5/2019

OTHER PUBLICATIONS

Li, Tong , et al., "Keypoint-Based Robotic Grasp Detection Scheme in Multi-Object Scenes", Sensors, 2021, 21, 2132, https://mdpi.com/journal/sensors, Mar. 18, 2021.

(Continued)

*Primary Examiner* — Basil T. Jos
(74) *Attorney, Agent, or Firm* — Jeffrey Schox; Diana Lin

(57) ABSTRACT

A method for object grasping can include: generating a set of keypoints for one or more detected objects in a scene; subdividing the set of keypoints into subsets, each corresponding to a subregion of a detected object; determining a graspability score for the subregion; determining a grasp location for the subregion; selecting a candidate grasp location; and optionally grasping an object using the candidate grasp location.

22 Claims, 13 Drawing Sheets

(56) References Cited

U.S. PATENT DOCUMENTS

2021/0122586 A1    4/2021  Sun et al.
2021/0125052 A1*   4/2021  Tremblay ................ B25J 18/00

OTHER PUBLICATIONS

Ma, Xiaojian, et al., "PointNetGPD: Detecting Grasp Configurations from Point Sets", arXiv:1809.06267, Sep. 17, 2018.
Morrison, Douglas, et al., "Closing the Loop for Robotic Grasping: A Rea-time, Generative Grasp Synthesis Approach", arXiv:1804.05172v2 [cs.RO] May 15, 2018.
Zapata-Impata, Brayan, et al., "Fast geometry-based computation of grasping points on three-dimensional point clouds", International Journal of Advanced Robotic Systems, Apr. 2, 2019.

* cited by examiner

METHOD AND SYSTEM FOR OBJECT GRASPING

CROSS REFERENCE TO RELATED APPLICATIONS

This application claims the benefit of U.S. Provisional Application No. 63/051,826 filed 14 Jul. 2020, which is incorporated herein in its entirety by this reference. This application claims the benefit of U.S. Provisional Application No. 63/051,870 filed 14 Jul. 2020, which is incorporated herein in its entirety by this reference. This application claims the benefit of U.S. Provisional Application No. 63/171,701 filed 7 Apr. 2021, which is incorporated herein in its entirety by this reference.

TECHNICAL FIELD

This technology relates generally to the robotics field, and more specifically to a new and useful method for object grasping.

DESCRIPTION OF THE PREFERRED EMBODIMENTS

The following description of the preferred embodiments of the technology is not intended to limit the technology to these preferred embodiments, but rather to enable any person skilled in the art to make and use this technology.

1. Overview

Figure 1:
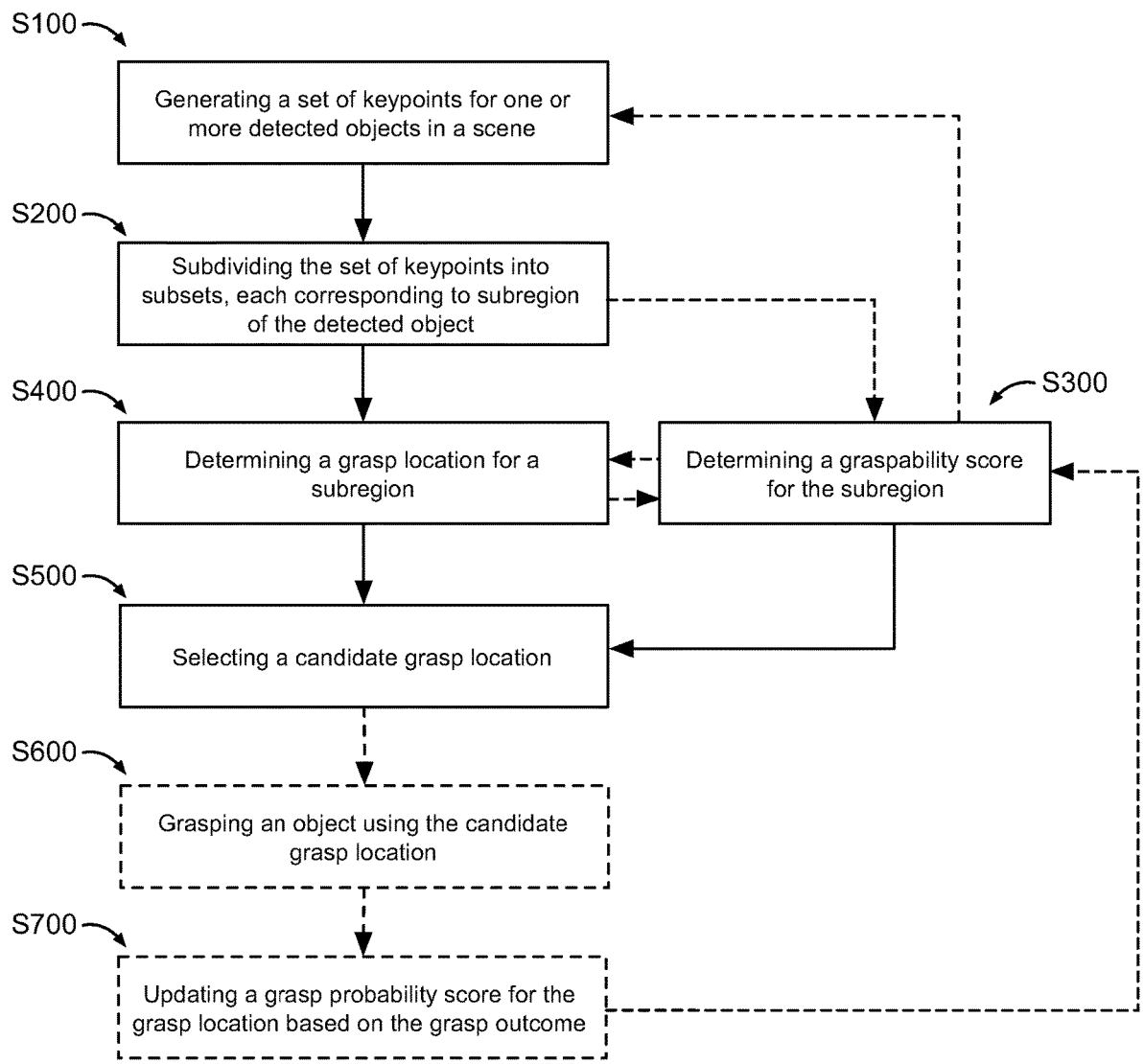
FIG. 1 is a schematic representation of a variant of the method.

As shown in FIG. 1, the method for object grasping can include: generating a set of keypoints for one or more detected objects in a scene S100; subdividing the set of keypoints into subsets, each corresponding to a subregion of a detected object S200; determining a graspability score for the subregion S300; determining a grasp location for the subregion S400; selecting a candidate grasp location S500; optionally grasping an object using the candidate grasp location S600; optionally updating the grasp probability score for the grasp location based on the grasp outcome (e.g., success or failure) S700; and/or any other suitable elements.

The method can function to increase the accuracy of grasping an object and/or increase the object grasping speed (e.g., decrease the duration between scene image sampling and grasp execution).

Figure 2:
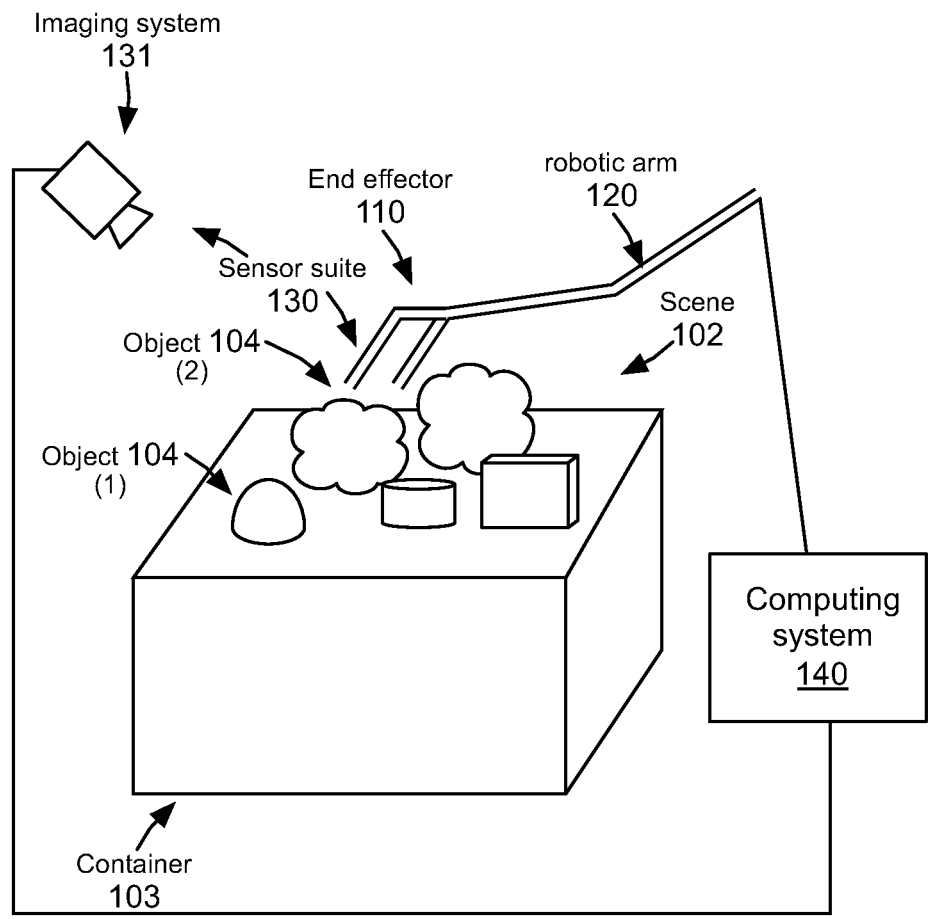
FIG. 2 is a schematic representation of a variant of the system.

The method is preferably performed using a system, an example of which is shown in FIG. 2, including: an end effector no, a robot arm 120, a sensor suite 130, a computing system 140, and/or any other suitable components. The system functions to enable selection of a candidate grasp location and/or articulate the robot arm to grasp an object 104 associated with the grasp location.

2. Examples

In a first variant, the method includes: generating a set of keypoints and an occlusion score for one or more detected objects using an object detector, wherein the keypoints are associated with key point identifiers (e.g., that can be unique per object instance, unique per object subregion, unique per object face, etc.); selecting a most visible object face per detected object based on the occlusion scores; selecting a subregion of the most visible face from a set of predefined subregions; determining the grasp point for the selected subregion by calculating the mean of the keypoints that belong to the selected subregion in 2D, wherein the keypoints are mapped to the subregion using the keypoint identifiers; mapping the 2D grasp point to the 3D grasp point by mapping to the 3D location on a point cloud; calculating a final score for the 3D grasp point; and selecting a candidate 3D grasp point with the highest final score.

Optionally during training, the method can include grasping the object using the 3D grasp point and updating the grasp probability score for the 3D grasp point (e.g., for the face or the subregion the 3D grasp point resides in) based on the grasp outcome.

In a specific example, the method can determine that of the three surfaces of a cylinder (e.g., side, top, and bottom), the best location to grasp the cylinder is the side of the cylinder's lower surface. The surfaces can be ordered and/or ranked based on the highest grasp probability score of the best location for grasping that surface or subregion of the surface.

In a second variant, an example of which is shown in FIGS. 10A-E, the method can include: receiving an image of a scene depicting a plurality of visible objects; using an object detector, generating a set of keypoints for an object within the scene (e.g., for an exposed portion of a visible object in the scene), wherein each keypoint defines a position within a coordinate frame of the image; subdividing each set of keypoints into regional subsets, wherein each regional subset corresponds to a predetermined subregion of the object; determining a grasp location for at least one of the regional subsets based on the positions of the respective keypoints; selecting, from a resultant set of grasp locations, a candidate grasp location for the visible object based at least in part on a grasp probability score associated with the respective subregion; and facilitating grasp execution based on the candidate grasp location.

Figure 9:
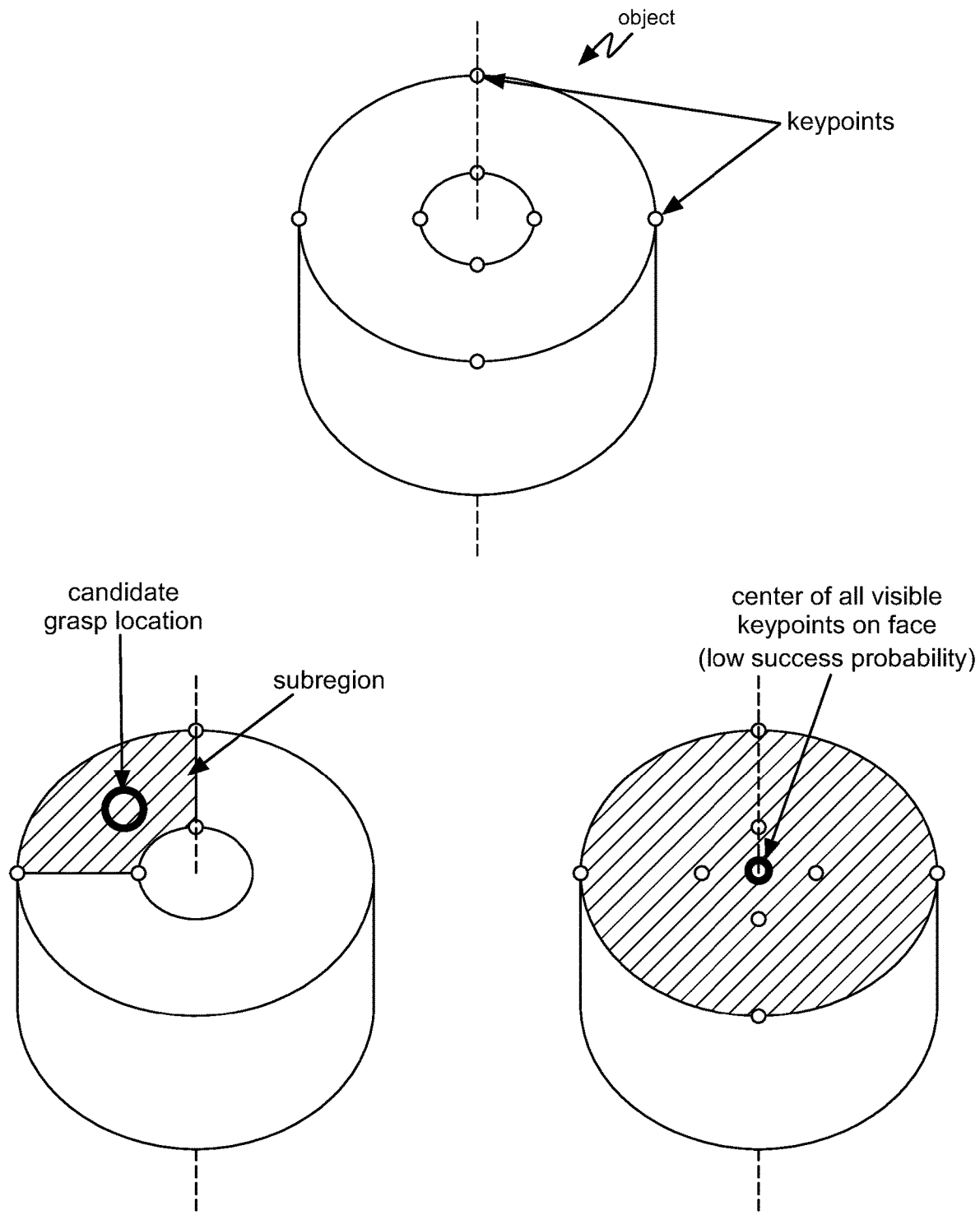
FIG. 9 is an example illustration of a candidate grasp location for a variant of the method.
Figure 10A:
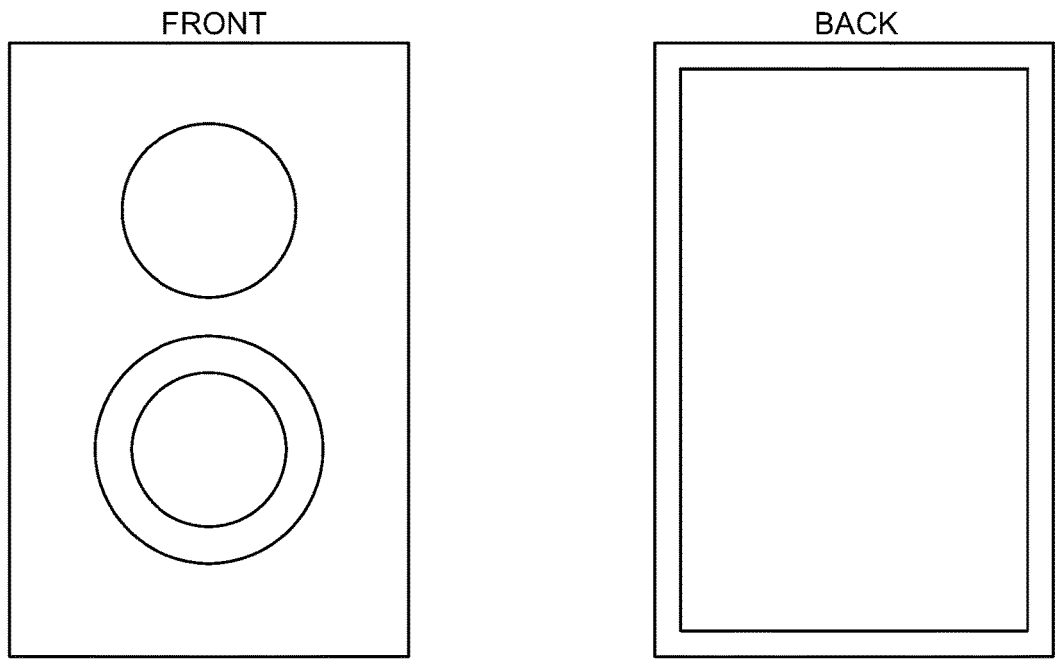
FIG. 10A-E are illustrative examples for a variant of the method. Grasp probability scores can be proportional to the size of the annular (unfilled) circles.
Figure 10B:
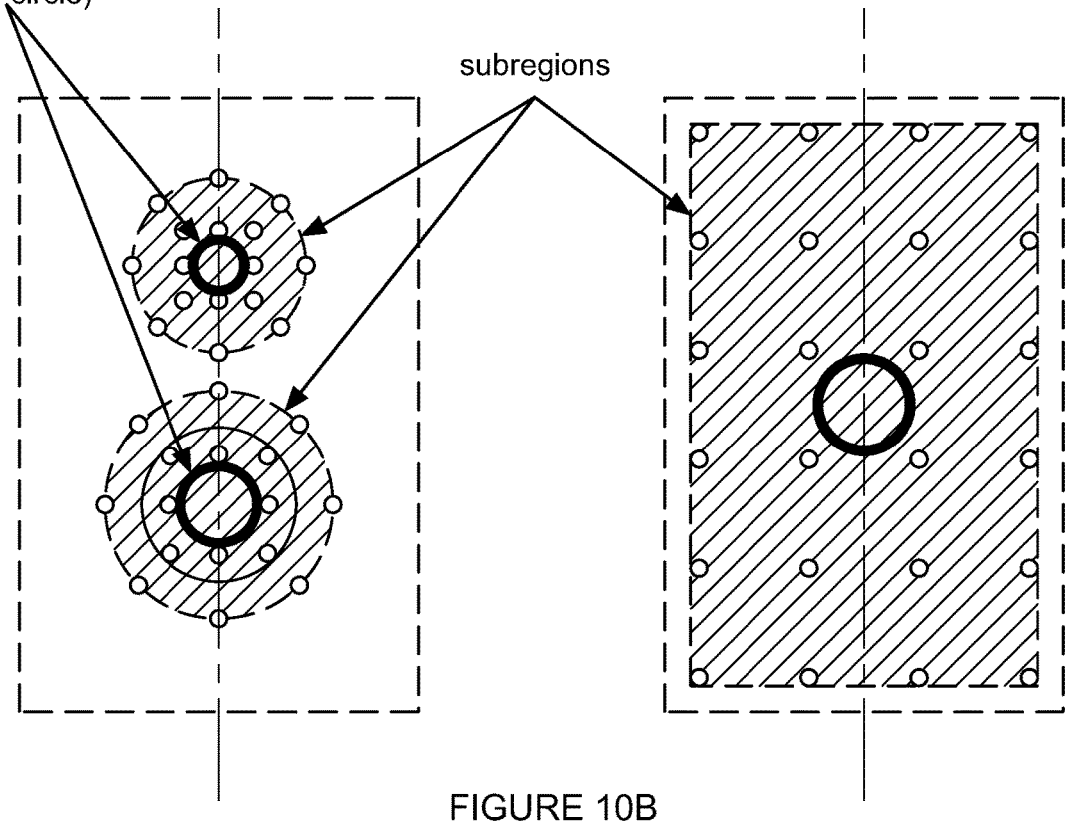
Figure 10C:
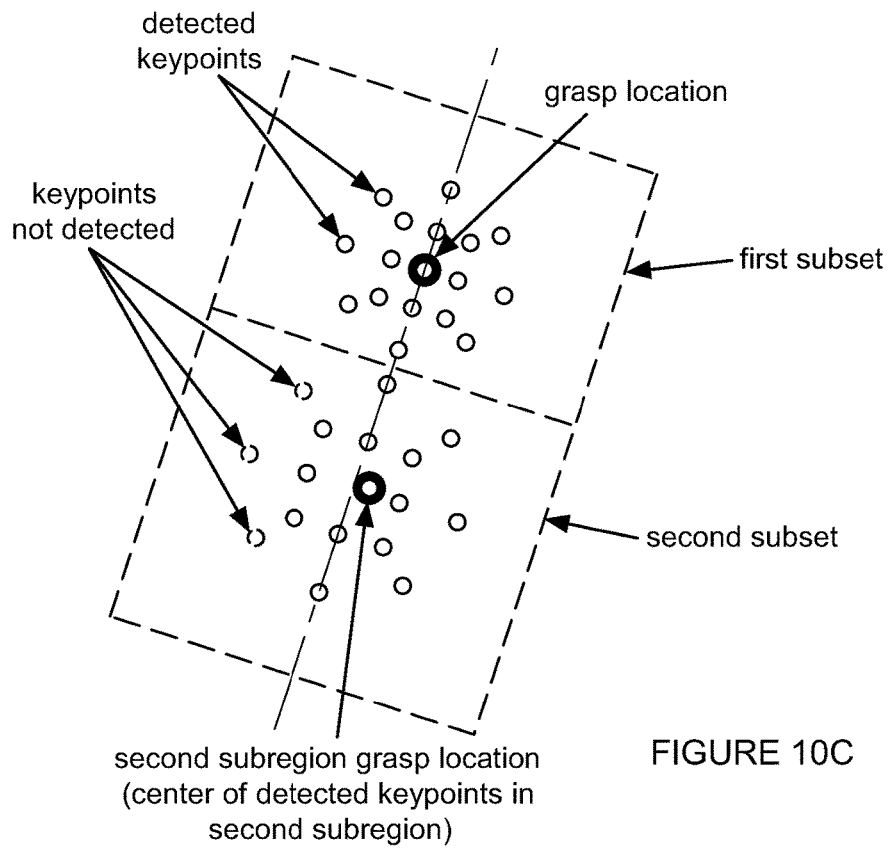
Figure 10D:
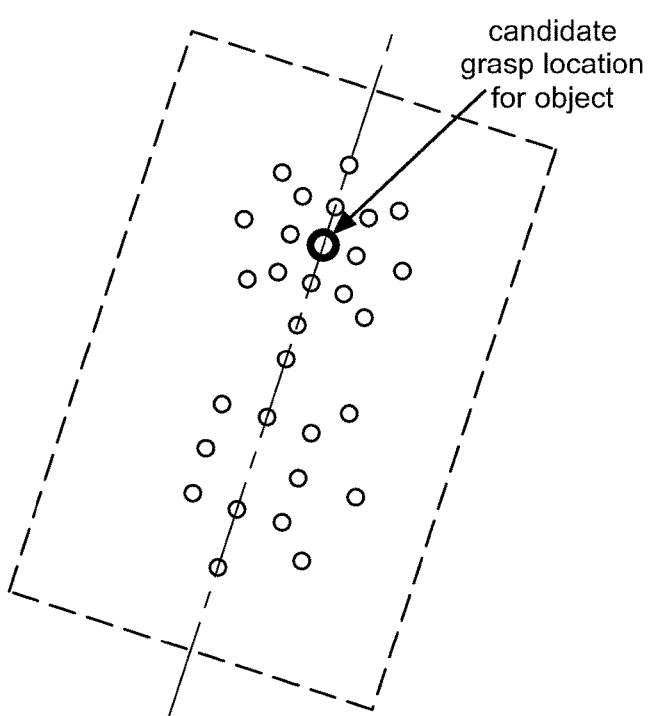
Figure 10E:
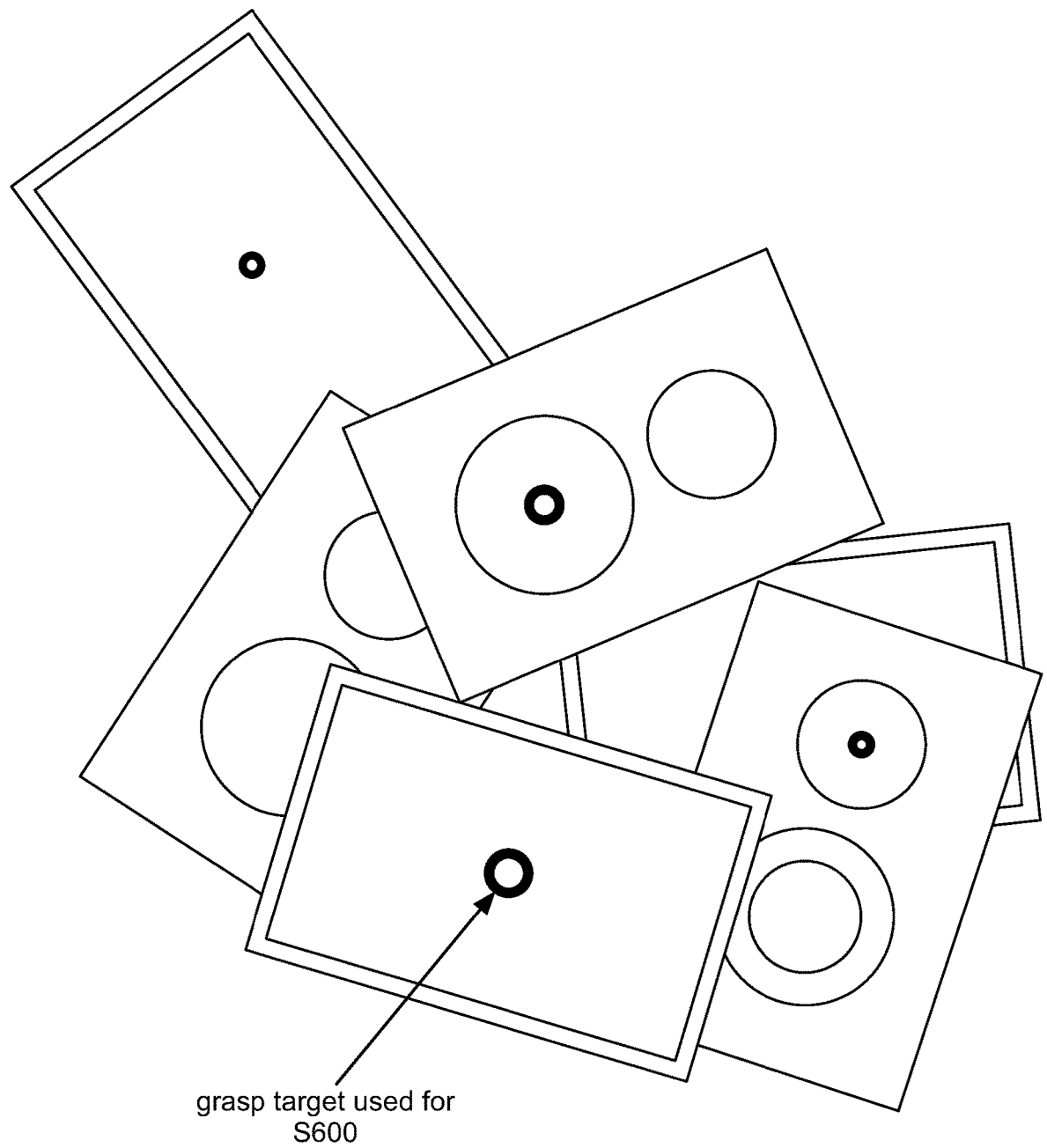

In variants, the method can improve picking for objects with internal cavities (e.g., having an annulus-shaped face, an example is shown in FIG. 9), internal edges, seams, or other difficult-to-grasp features. In such variants, picking in the center of a side/face of the object can be undesirable if the center has a lower success rate than other parts of the object. As an example: it may be undesirable to pick (e.g., using a suction gripper) from the center of the top face of a tissue box, and rather may be more desirable to grip the object at one of the remaining faces or periphery of the top face-thus avoiding the difficult-to-grasp tissue-dispensing portion.

In variants, the method can improve picking for scenes with highly occluded and/or overlapping objects. In such instances, picking from a deterministic position relative to various object features and/or keypoints can result in picking at the boundary between overlapping objects (e.g., at an edge of one object). As an example, for a bin of pencils, even the least occluded and/or topmost object in a frame may be overlapped by another object at a deterministic pick location. In such instances, it can be advantageous to pick within portions of the object which are visible and/or to pick at a center of position relative to visible keypoints.

The term "grasp location" or "grasp point" as used herein can refer to a physical point in space (e.g., within the scene), a virtual point corresponding to the physical point, a 3D point in space, a 2D image feature in an image, a point (e.g., voxel or set thereof) in a depth image (e.g., 2.5D), and/or any other suitable grasp point. Likewise, a "grasp location" can be defined in and/or referenced relative to joint/cartesian coordinate frame (e.g., spatial domain) or a sensor coordinate frame (e.g., image coordinate frame, pixel position; a planar projection of spatial domain, etc.). It is understood that conversion between sensor coordinate frames and spatial/join coordinate frames is known and understood in the field of endeavor, and thus they may be considered interchangeable as may be convenient.

3. Benefits

The method can confer several benefits over conventional systems.

Figure 8:
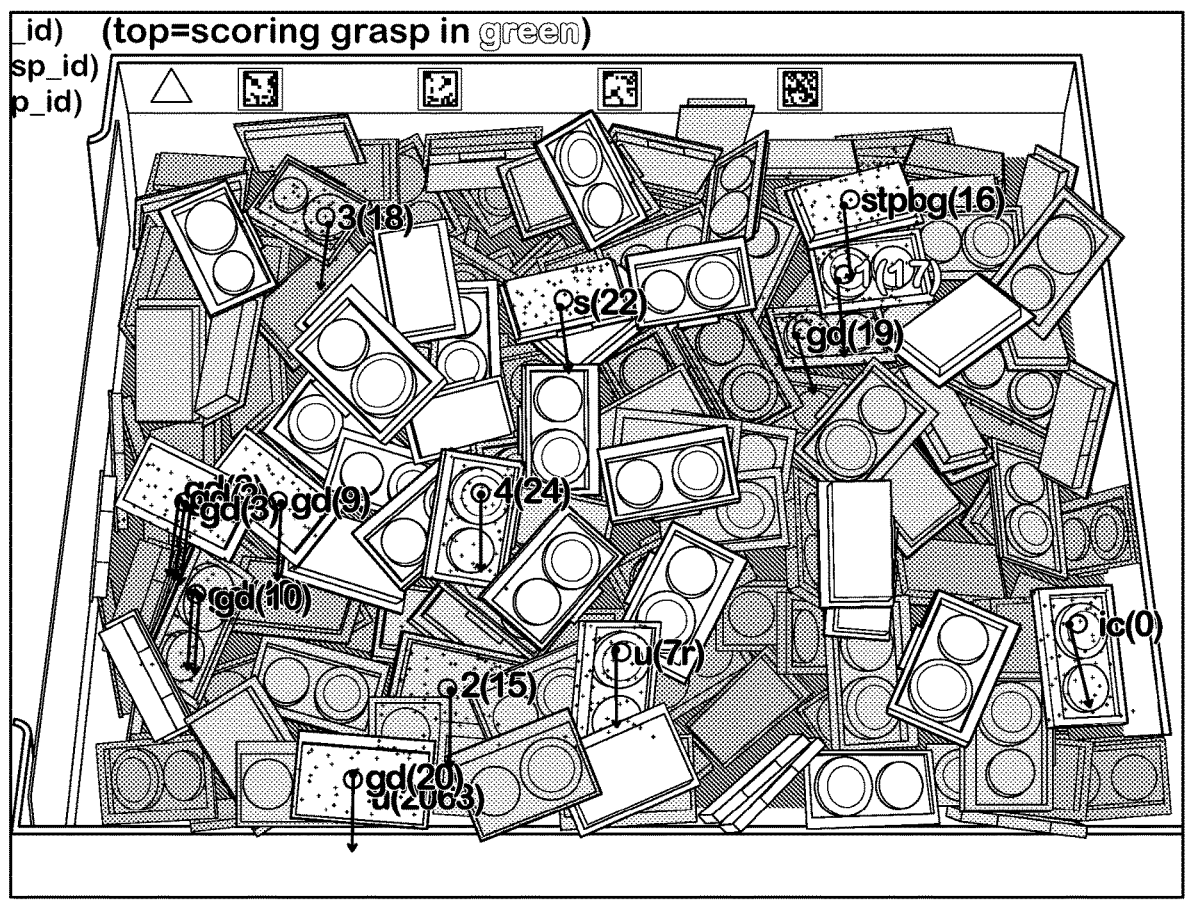
FIG. 8 is an example object scene with candidate grasp locations determined for various detected objects in a variant of the method.

First, variants of the system and method enable object grasping from a bin of objects, wherein the objects can be overlapping with other objects and in any random pose. Such variants can improve the grasp success rate for highly occluded objects and/or object scenes (e.g., an example is shown in FIG. 8) by avoiding difficult-to-grasp features of an object and/or by avoiding overlapping objects.

Second, variants of the system and method enable more accurate object grasping by determining visible faces of an object and selecting a subregion of the visible face that is more likely to result in a grasp success than other subregions of the visible face.

Third, variants of the system and method enable faster object grasp calculation and training than conventional methods that require 6D object pose estimation, by calculating features in 2D, determining a 2D grasp location from the features, and mapping the 2D grasp location to the 3D grasp location based on a 3D point cloud. In such variants, the method can be executed in real-time and/or substantially real time by utilizing neural networks which are highly efficient for point determination/selection within 2D scenes. In variants, the runtime efficiency can be further improved by selecting grasp locations based only on a subset of keypoints and/or objects visible within the frame.

However, the method and system can confer any other suitable benefits.

4. System

The method is preferably performed using a system, an example of which is shown in FIG. 2, including: an end effector no, a robot arm 120, a sensor suite 130, a computing system 140, and/or any other suitable components. The system functions to enable selection of a candidate grasp location and/or articulate the robot arm to grasp an object 104 associated with the grasp location.

The end effector preferably functions to grip an object 104. The end effector can be impactive, ingressive, astrictive, contigutive, and/or any other suitable type of end effector. In a first example, the end effector is a suction gripper. In a second example, the end effector is a claw gripper (e.g., dual prong, tri-prong, etc.). The end effector can be actuated: electrically (e.g., servo/motor actuation), pneumatically, hydraulically, unactuated (e.g., passive deformation based on motion of robot arm, rigid body, etc.), and/or otherwise actuated. However, the system can include any other suitable end effector. The end effector is preferably mounted to the robot arm, but can additionally or alternatively be mounted to and/or transformed by any suitable actuation mechanism(s) (e.g., CNC gantry system, etc.) and/or in any suitable actuation axes (e.g., 6-axis robotic actuation). However, the end effector can be otherwise configured.

The robot arm 120 preferably functions to position and/or articulate the end effector for grasping an object, but can additionally or alternatively provide any other suitable functionality. The robot arm can be articulated by automatic control and/or can be configured to automatically execute control instructions (e.g., control instructions determined based on the grasp point, dynamically determined control, etc.), however the system can alternatively be otherwise suitably controlled and/or otherwise suitably enable end effector articulation. The robot arm can include any suitable number of joints which enable articulation of the end effector in a single degree of freedom (DOF). The arm preferably includes 6 joints (e.g., a 6-axis robot arm), but can additionally or alternatively include seven joints, more than seven joints, and/or any other suitable number of joints.

The sensor suite 130 can include imaging systems 131, actuation feedback systems, and/or any other suitable sensors. Actuation feedback sensors of the actuation feedback system preferably function to enable control of the robot arm (and/or joints therein) and/or the end effector, but can additionally or alternatively be used to determine the outcome (e.g., success or failure) of a grasp attempt. Actuator feedback sensors can include one or more of a: force-torque sensor, gripper state sensor (e.g., to determine the state of the gripper, such as open, closed, etc.), pressure sensor, strain gage, load cell, inertial sensor, positional sensors, displacement sensors, encoders (e.g., absolute, incremental), resolver, Hall-effect sensor, electromagnetic induction sensor, proximity sensor, contact sensor, and/or any other suitable sensors. However, the sensors can be otherwise configured. The sensor suite can include an imaging system which preferably functions to capture images of the inference scene, but can provide any other functionality. An imaging system can include: stereo camera pairs, CCD cameras, CMOS cameras, time-of-flight sensors (e.g., Lidar scanner, etc.), a range imaging sensors (e.g., stereo triangulation, sheet of light triangulation, structured light scanner, time-of-flight, interferometry, etc.), and/or any other suitable sensor. The sensors can be arranged into sensor sets and/or not arranged in sets. The imaging systems can determine one or more RGB images, depth images (e.g., pixel aligned with the RGB, wherein the RGB image and the depth image can be captured by the same or different sensor sets). Imaging sensors are preferably calibrated within a common coordinate frame (i.e., sensor coordinate frame) in a fixed/predetermined arrangement relative to a joint coordinate frame of the robot arm, but can be otherwise suitably configured. Sensors of the sensor suite can be integrated into the end effector, the robot arm, and/or any other component of the system, or can be otherwise mounted to a superstructure (e.g., above a picking bin/container, camera directed toward a picking bin, etc.), mounted to the robot arm, mounted to the end-effector, and/or otherwise suitably arranged. However, the sensor suite can be otherwise configured.

The computing system can function to perform one or more steps of the method, but can additionally or alternatively provide any other suitable functionality. The computing system can be local to the robot, remote, and/or otherwise located. The computing system can include one or more modules (e.g., control module, grasp selection module, grasp probability module, etc.).

The control module can function to control the robot, the one or more sensors, and/or any other system component. The control module can be wirelessly connected, electrically connected, and/or otherwise connected to one or more components of the system. The control module can include a motion planner, which functions to determine control instructions for the robot arm to execute a grasp attempt for a grasp location. The motion planner can employ any suitable control scheme (e.g., feedforward control, feedback control, etc.). The control instructions can include a trajectory for the robotic arm in joint (or cartesian) coordinate space, and/or can include any other suitable control instructions (e.g., CNC waypoints, etc.). However, the system can include any other suitable control module, and/or can otherwise suitably effect motion/articulation of the end effector to execute a grasp attempt.

However, the control module can be otherwise configured.

The grasp selection module can function to execute all or a portion of the method. The grasp selection module can select a grasp location using one or more heuristics, rulesets, and/or any other selection criteria. The grasp selection module can optionally compute the final scores for each grasp location and use the final scores to select the grasp location. The grasp selection module can be: a voting algorithm, a weighted equation, a set of heuristics, a set of rules, a neural network, and/or any other suitable module.

In variants, the grasp selection module can include the grasp selector and/or method elements as described by U.S. application Ser. No. 17/375,798, titled "METHOD AND SYSTEM FOR GRASPING AN OBJECT" filed 14 Jul. 2021, which is incorporated herein in its entirety by this reference.

In variants, the grasp selection module can integrate the grasp selection method and/or system elements as described by U.S. application Ser. No. 17/375,424, titled "METHOD AND SYSTEM FOR OBJECT GRASPING", filed 14 Jul. 2021, which is incorporated herein in its entirety by this reference.

However, the grasp selection module can be otherwise configured.

The grasp probability module can function to determine and/or update grasp probability scores for subregions and/or grasp locations therein. However, the grasp probability score can be determined for the subregion or any other suitable object subset. The grasp probability score for a grasp location can be: independently determined for a given grasp location (e.g., point on an object, region of an object); inherited from the subregion that the grasp location is in; and/or otherwise determined. The grasp probability module can include a trained neural network (e.g., trained to determine a grasp probability score), set of heuristics, an equation, a lookup table (e.g., relating key points, the subregion, or grasp locations with a grasp probability), and/or other probability determination method. The grasp probability scores can be predetermined; empirically determined (e.g., calculated based on historic grasp attempts at the point); updated based on prior iterations, dynamically determined (e.g., based on the measured scene parameters); and/or otherwise determined. The predetermined grasp probability score can be determined based on the number of grasp attempt successes and the number of grasp attempt failures (e.g., success divided by total grasp outcomes, failure divided by total grasp outcomes, etc.); based on the mass distribution at the grasp location; based on the geometry surrounding the grasp location; based on the surface area surrounding the grasp location; and/or otherwise determined. However, the grasp probability module can be otherwise configured.

The object detector functions to detect objects and/or other information in images. For example, the object detector can determine: individual instances of one or more object types, object parameters for each object (e.g., pose, principal axis, occlusion, etc.), total object count, and/or other object information. The object detector output is preferably used by a downstream grasp selection module to select a candidate grasp location; alternatively, the object detector can be otherwise implemented.

The object detector can be a neural network (e.g., CNN, fully connected, etc.), a graphical model (e.g., RCN, Bayesian network, etc.), a logistic regression, a clustering algorithm, an ORB feature detector, and/or any other suitable feature detector. The object detector can be a generative model, a discriminative model, and/or any other suitable object detector. In specific examples, the object detector can leverage one or more of: the architectures disclosed in U.S. application Ser. No. 15/461,748 filed 17 Mar. 2017, U.S. application Ser. No. 16/298,932 filed 11 Mar. 2019, and/or U.S. application Ser. No. 15/708,383 filed 19 Sep. 2017, each of which are incorporated in their entireties by this reference; RCN; CNNs (e.g., YOLO, R-CNN, R-FCN, etc.); histogram of gradients (HOG); single shot detectors (SSD); spatial pyramid pooling (SPP-net); and/or other models.

In some variants the object detector can be trained and/or updated based on synthetic images (e.g., trained using a set of artificially-generated object scenes), but can alternatively be trained on images of real scenes and/or other images. The synthetic images can be generated using the method disclosed in U.S. application Ser. No. 17/375,331, titled "METHOD AND SYSTEM FOR GENERATING TRAINING DATA", filed 14 Jul. 2021 incorporated herein in its entirety by this reference, generated using another method, retrieved from a database, or otherwise generated.

The input to the object detector is preferably a 2D image, but can additionally or alternatively include a depth map, point cloud, or any other suitable input. The output of the detector can include one or more features, keypoints (e.g., surface keypoints, unique object features, object bounding box features, etc.), labels (e.g., face labels, silhouette labels, texture labels, haptic labels), one or more object masks, one or more scores (e.g., a visibility score for each object, for each feature, etc.), and/or any other suitable information.

In a specific example: the object detector can determine a set of keypoints using an RGB-depth image.

However, the object detector can be otherwise configured.

However, the computing system can be otherwise configured.

The one or more models can include object detectors, which function to locate objects, determine keypoints (e.g., each with a face- or subregion-associated identifier that is locally unique within the object), and/or other information in images; grasp selection modules that generate and evaluate grasp candidates; planning modules that plan a grasp trajectory based on the selected grasp point; and/or other models. The models can be a convolutional neural network (CNN), such as YOLO, a transformer network, any other neural network (e.g., feed forward, RNN, etc.), a sliding-window feature detector and/or classifier, an inference result from a learned graphical model (e.g., RCN), a clustering algorithm, an ORB feature detector, and/or any other suitable model. However, the one or more models can be otherwise configured.

Figure 4:
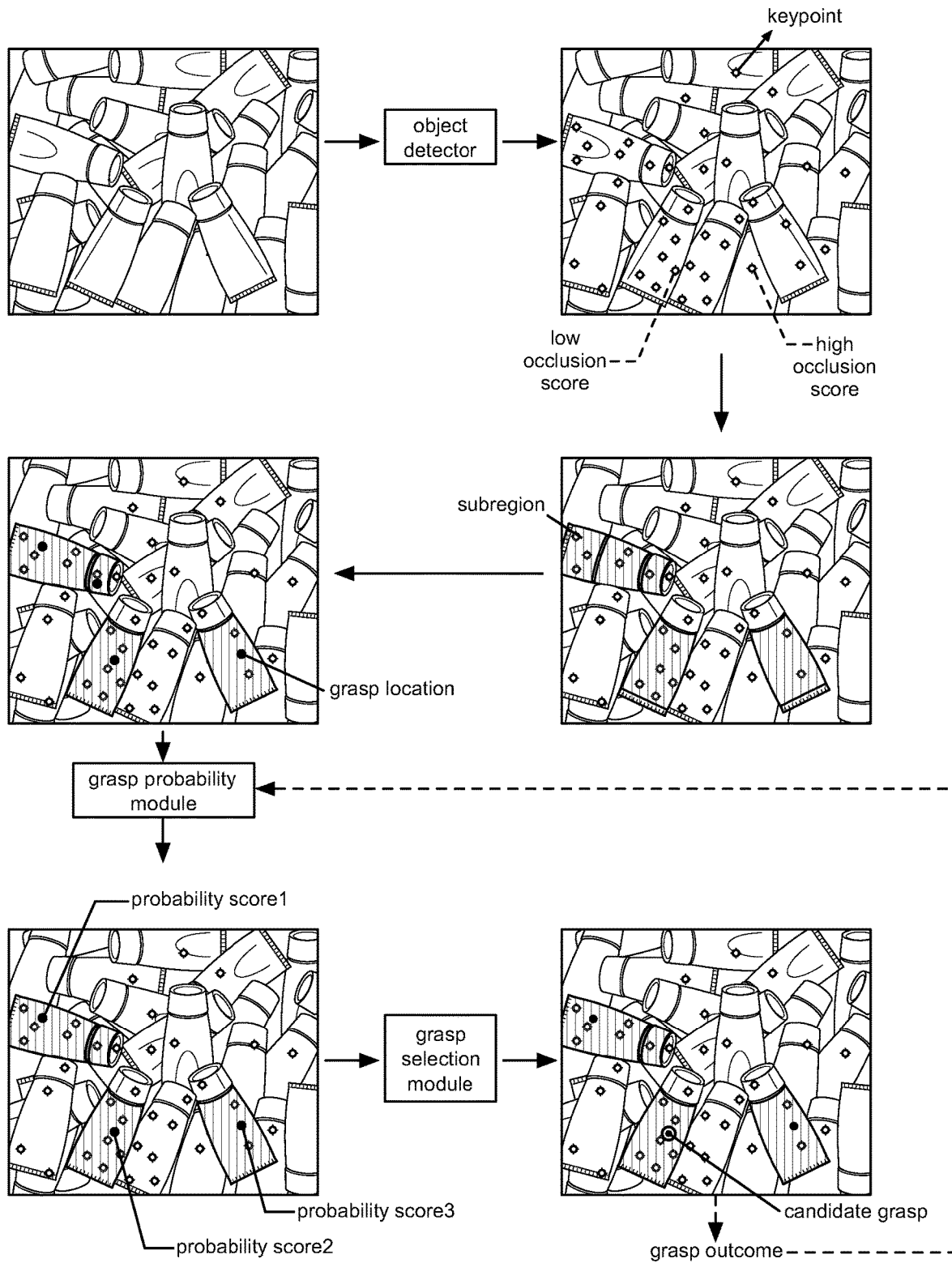
FIG. 4 is an illustrative example of the method.

The objects can be arranged as part of a scene (e.g., as depicted in FIG. 4). The scene can include objects within a container, objects on a surface, and/or objects can be otherwise configured. The objects can be overlapping or non-overlapping, in a random pose or in a predetermined pose, and/or otherwise arranged. The objects can be: rigid, deformable, matte, transparent, reflective, and/or have any other suitable property(ies). The objects can be: cylindrical, rectangular, and/or any other suitable shape. Object examples include: containers, toys (e.g., plush, metal, plastic, etc.), food, and/or any other suitable object(s). The objects can include one or more components: lids, compartments, parts, and/or any other suitable subcomponents or internal features. Each object can be segmented into one or more faces (e.g., automatically, manually, etc.) based on the object's components.

Each type of object can be represented by a different virtual object model, wherein different instances of the same object can be associated with different instances of the same virtual object model. Each virtual object model can include one or more object faces (e.g., top, side(s), bottom, etc.). Faces of the virtual object model can include one or more subregions. Each object model can be associated with a set of keypoints, wherein each keypoint is associated with a specific face and/or subregion, but can alternatively be associated with multiple faces and/or subregions. The keypoints can be used to determine a grasp location for the subregion and/or for the object face. The object can define one or more axes (e.g., x, y, z). Sections of each axis can be associated with the different subregions. However, the objects can be otherwise configured.

The one or more candidate grasp locations can be: grasp point, grasp position determined based on a principal axis, a key point, a synthetic key point (e.g., generated from the detected key points), and/or any other suitable location on an object. The candidate grasp location can be 2D or 3D. The candidate grasp location can be associated with a grasp probability score (e.g., likelihood of grasp success), and/or any other suitable information. Each object can be associated with a single candidate grasp location, multiple candidate grasp locations (e.g., per visible face, per subregion of the visible faces, etc.), or no candidate grasp locations. All or parts of the candidate grasp locations can be predetermined, determined by the method, and/or otherwise determined. However, the candidate grasp locations can be otherwise configured.

5. Method

As shown in FIG. 1, the method for object grasping can include: generating a set of keypoints for one or more detected objects in a scene S100; subdividing the set of keypoints into subsets, each corresponding to a subregion of a detected object S200; determining a grasp location for a subregion S300; optionally determining a graspability score for the detected object S400; selecting a candidate grasp location S500; optionally grasping an object using the candidate grasp location S600; optionally updating the grasp probability score for the grasp location (e.g., for the face or the subregion which the grasp location resides in) based on the grasp outcome (e.g., success or failure) S700; and/or any other suitable elements.

The method can function to increase the accuracy of grasping an object and/or increase the object grasping speed (e.g., decrease the duration between scene image sampling and grasp execution).

The method is preferably performed by the system disclosed above, but can be otherwise performed. The method can be performed once, iteratively (e.g., for identical instances of each method element; for with distinct variants of method elements, etc.), repeatedly, periodically, and/or occur with any other suitable timing.

Generating a set of keypoints for one or more detected objects in a scene S100 can function to determine information for detected objects that can be used to generate candidate grasp locations in S400. S100 can be repeated for all detected objects in the scene, a single object, and/or any other suitable set of objects, or be applied to the scene as a whole (e.g., wherein the set of keypoints is determined for the scene, and not associated with individual objects). S100 can be performed after images of the scene are captured by the one or more sensors and/or at any other suitable time. S100 can be performed using an object detector and/or any other suitable model.

The object detector can be one or more of the models described above, and/or any other suitable machine learning model. The input to the object detector is preferably a 2D image (e.g., sampled during runtime, sampled during a prior instance of the method, etc.), but can additionally or alternatively include a depth map, depth mask, point cloud, or any other suitable input. The output of the detector is preferably one or more keypoints, features, labels (e.g., face labels, silhouette labels, texture labels, haptic labels), one or more object masks, one or more scores (e.g., a visibility score for each object, for each feature, etc.), one or more bounding boxes, and/or any other suitable information. An object detector can detect multiple objects in an image; a single object, wherein multiple object detectors are used to each detect a different object in the image; and/or any other number of objects. However, the object detector can be otherwise configured.

The set of keypoints can be 2D keypoints or 3D keypoints. Each keypoint can be: object face keypoints (e.g., associated with face tags or face labels; "face tagged features"), object feature keypoints, surface keypoints, and/or any other suitable keypoints. Each keypoint can be associated with an object face, a subregion (or multiple subregions) within the object face, an axis, and/or otherwise associated with the object. Each keypoint can be associated with a keypoint identifier. Each keypoint identifier is preferably unique within an object instance (e.g., that associates the keypoint with a particular object face and/or object face subregion), but shared across object instances (e.g., the same keypoint identifier is determined for the same keypoint on the same face of two different object instances. Alternatively, the keypoints can be globally unique (e.g., within the scene). However, any other suitable set of keypoints can be determined.

S100 can optionally include determining an occlusion score, which can represent a score for an occluded area or point of an object (e.g., how much an object is occluded by other objects, by a container, whether a point is occluded, etc.) for the object or portion of the object. The occlusion scores are preferably determined per keypoint, but can additionally or alternatively be determined per object face, per visible object face (e.g., each object surface which is at least partially visible), per subregion, per object, or otherwise associated with the object. The occlusion score can be determined by the object detector, calculated by the method, manually generated, and/or otherwise determined. The occlusion score can be a percentage, binary score (e.g., yes or no; occluded or unoccluded/non-occluded; exposed or unexposed; etc.), or any other suitable score. The object score can be determined based on: the visible proportion of the object face; the occluded proportion of the object face; the depth of the keypoint, face, or subregion; and/or based on other scene data.

In a first variant, the entire boundary of each object instance is detected by the object detector or inferred from the object detector outputs, wherein determining the occlusion score can include: for each object, determining a mask from the upper object instances (e.g., detected within and/or depicted within the image; objects above the object of interest, as determined from visual cues or depth information; using the upper objects' detected boundaries; etc.); and determining an occlusion score based on the mask. In a first embodiment where the occlusion score is for the keypoint, this can include assigning a low score (e.g., "0") to keypoints of the object that overlap with the mask, and assigning a high score (e.g., "1") to keypoints of the object that do not overlap with the mask. In a second embodiment where the occlusion score is for the object or subregion, this can include determining the portion of the object instance or subregion that does not overlap with the mask. However, the occlusion score can be otherwise determined. The mask can optionally be used to verify that the grasp location (determined in S400) is accessible, such as by verifying that the grasp location does not overlap the mask.

In a second variant, the object detector can output an occlusion score for each keypoint. In this variant, the object detector can be trained on target data including the keypoint identifiers, the keypoint locations (e.g., within a synthetic image), and/or the corresponding occlusion score for each keypoint (e.g., determined based on whether the portion of the synthetic object corresponding to the keypoint within the synthetic scene is occluded by an upper synthetic object instance).

In a third variant, the object detector can be trained to only detect unoccluded keypoints depicted in the image.

However, the occlusion score can be otherwise determined.

The one or more detected objects can represent object detections in a scene. The detected objects can be represented by an object mask, an object bounding box, principal axis/axes (e.g., 2D projection into image coordinate frame, 3D, 6D, etc.), and/or any other suitable information. The detected objects can be determined using the object detector and/or any other model. In variants, detected objects and/or keypoints can include a detection probability associated with the object detection and/or each detected keypoint associated therewith. The detection probability can be determined by the object detector and/or a separate model, or otherwise suitably determined (e.g., using any suitable voting algorithms, weighted equations, heuristics, ruleset, neural network, etc.).

In a first variant, S100 can include capturing one or more images of the inference scene and/or retrieving one or more images of the inference scene stored during a previous cycle of the method; optionally determining a 3D point cloud and optionally surface normals for each point of the point cloud based on the one or more images and/or contemporaneously sampled depth information; processing the one or more images, the point cloud, and/or surface normals, using the detector to determine the key points and the occlusion score.

In a second variant, S100 can include providing an image, and optionally depth information, of the scene to a trained neural network (e.g., RCN), wherein the neural network detects a set of visible object keypoints and the associated occlusion score for each detected keypoint.

However, the set of keypoints and set of occlusion scores can be otherwise determined.

Subdividing the set of keypoints into subsets, each subset corresponding to a subregion of a detected object S200 can function to identify subregions of the object which are visible and/or to be used to determine a candidate grasp location. Additionally or alternatively, subdividing the set of keypoints into subsets can blacklist regions of the object with a low success probability, removing them from consideration for subsequent selection of a candidate grasp location. S200 can be repeated for all detected objects in the scene, a single object, and/or any other suitable set of objects.

A subregion can be: a segment of an object (e.g., upper, middle, lower, right, or left segments), a segment of an object component (e.g., upper, middle, lower, right, or left segments), a subcomponent of the object exterior (e.g., faces, sides, surfaces, flat sections, non-concave regions, etc.), and/or otherwise defined. The subregions are preferably predetermined based on the geometry of the object (e.g., virtual geometry, physical geometry), but can be otherwise determined. Subregions are preferably smooth three-dimensional geometric surfaces (e.g., rough surface textures of a real object can define a geometrically smooth surface topology), or otherwise define regions of the object without seams or corners. Alternatively, subregions can be planar 2D surfaces, or otherwise defined as a collection of keypoints (irrespective of intervening surface topology).

Subregions are preferably predefined (e.g., before S100, before runtime, etc.), but can alternatively be dynamically defined during runtime or otherwise defined.

Subregions can be defined for a section of an object face, an entirety of an object face, span multiple faces of the object, and/or can be otherwise suitably defined. Subregions can overlap with a neighboring subregion(s), or be separate (e.g., non-overlapping). The subregion can be rectangular, circular, annular, polygonal (e.g., convex polygon, irregular polygon, etc.), or any other suitable geometry. The subregions may be able to be combined to span the entire object exterior (e.g., or any projection thereof) or a portion of the object. In an example, subregions can exclude interior cavities (e.g., for a suction gripper: the interior region of a tissue box; regions having less than a threshold grasp probability score and/or graspability score; etc.).

Figure 5:
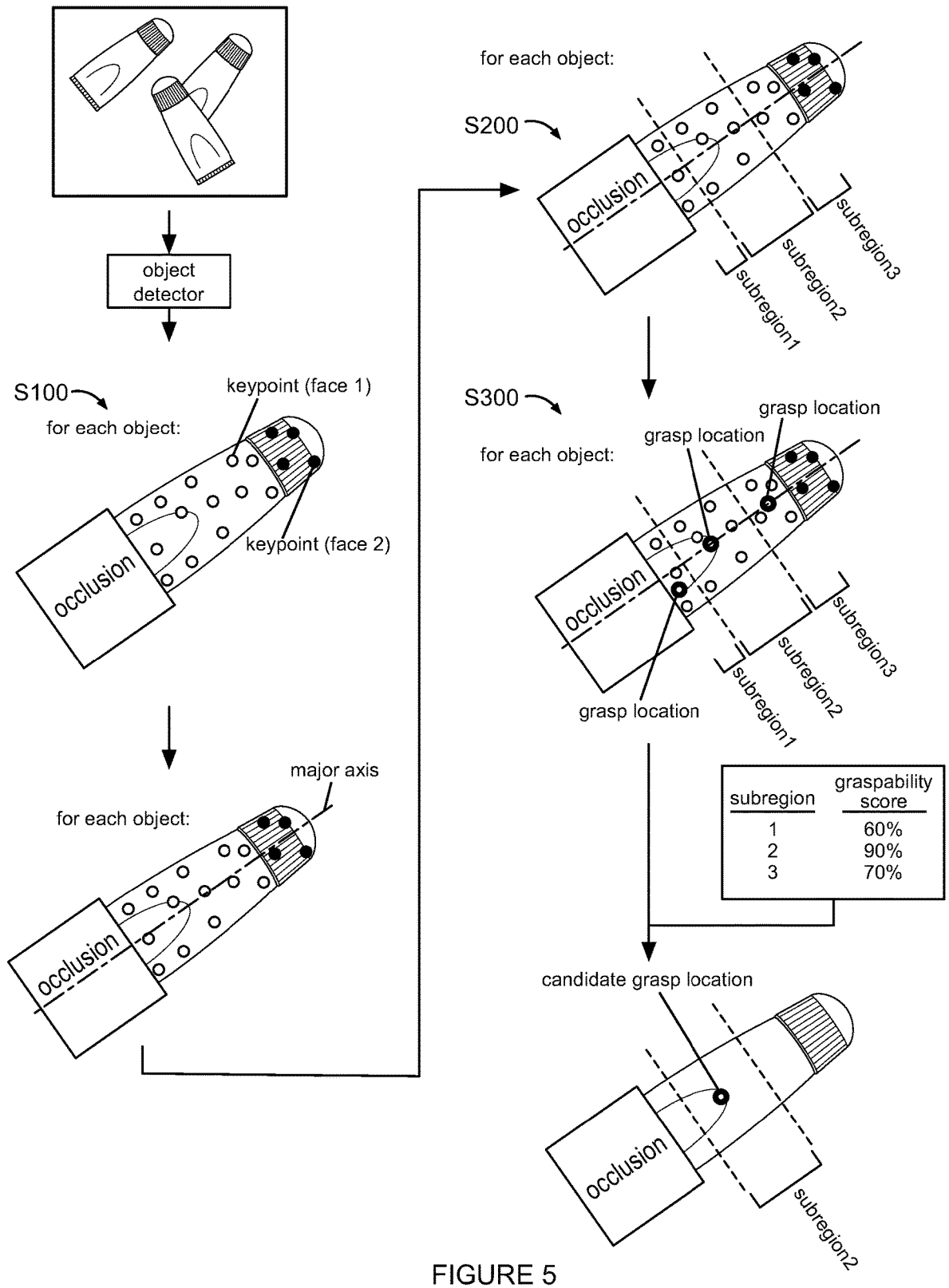
FIG. 5 is a diagrammatic example of a variant of the method.
Figure 6A:
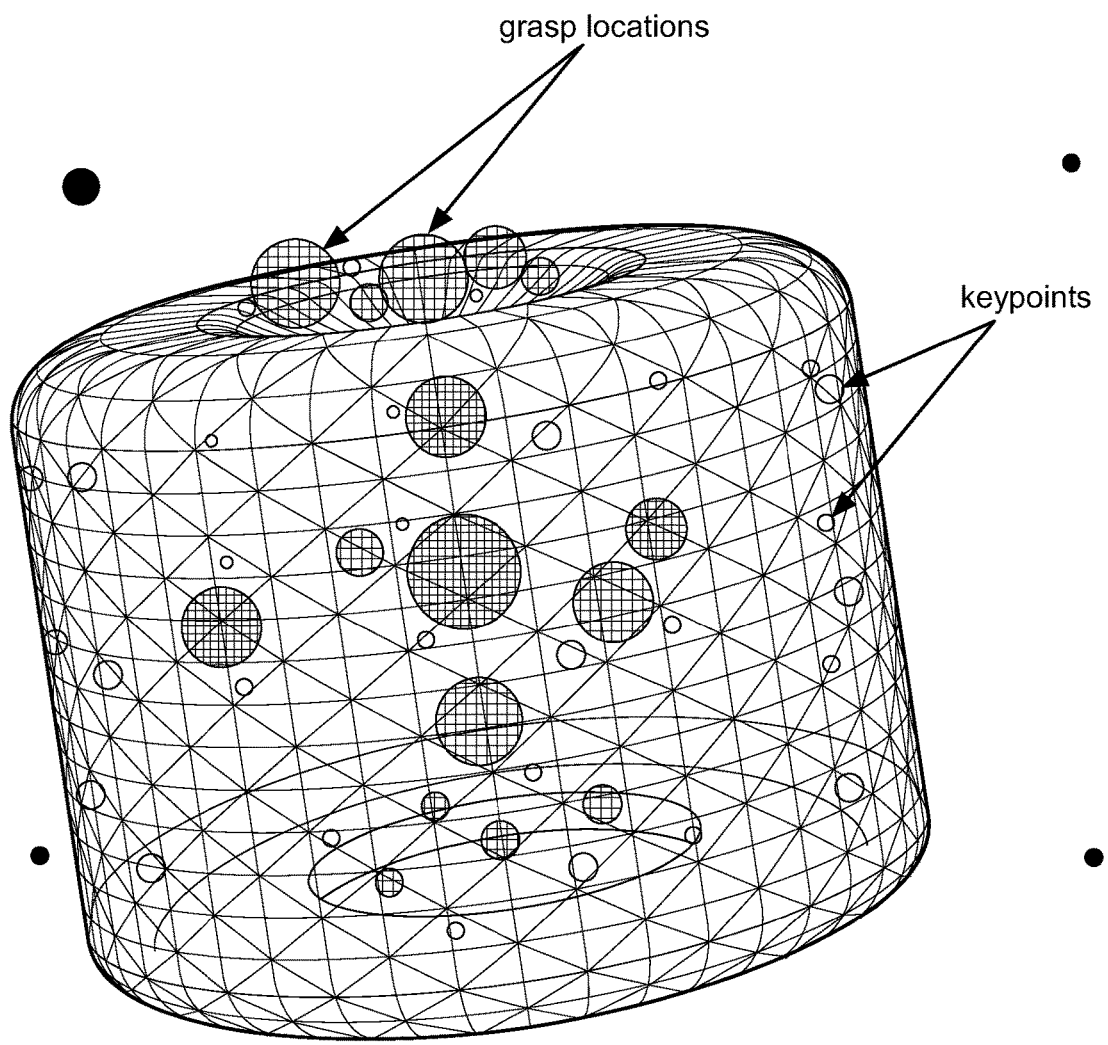
FIGS. 6A and 6B are example 3D views of a variant of weights for various subregions of a virtual object in a first and second variant of the method, respectively. Brighter red can indicate a higher grasp success rate. A larger sphere indicates that the subregion has been grasped more often.
Figure 6B:
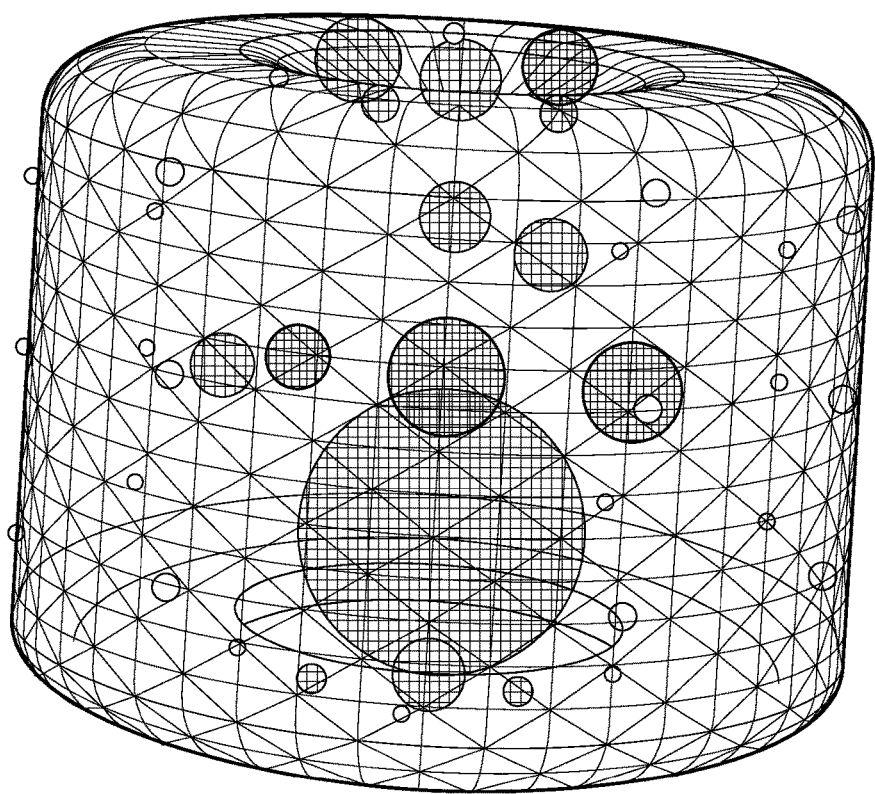
Figures 7A, 7B, 7C, 7D:
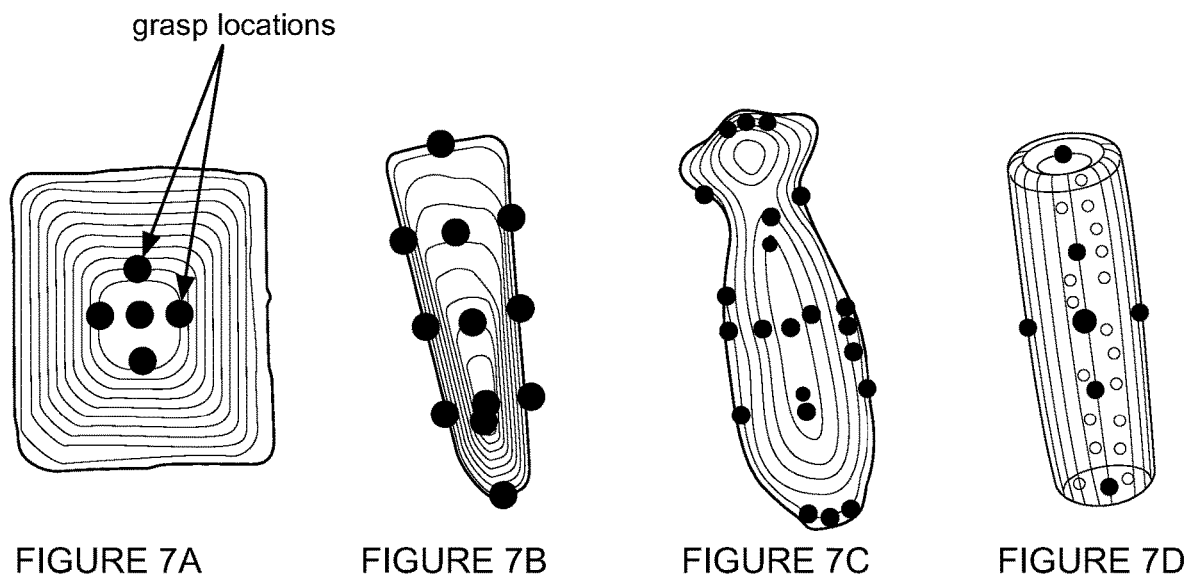
FIG. 7A-F are examples of virtual weights for various virtual objects.
Figures 7E, 7F:
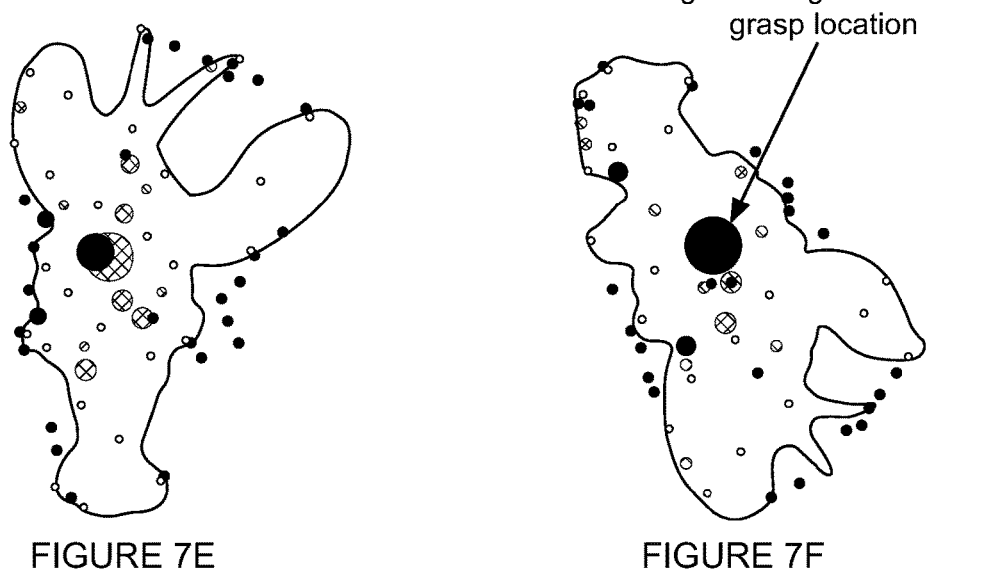

Subregions can be symmetric or asymmetric relative to a principal axis of the object. In an example, subregions can be defined along a single axis, an example of which is shown in FIG. 5. In a specific example, subregions can be defined as equal- or unequal-sized 'bands' defined by a range of positions along the axis (e.g., subdividing the object into quartiles along the length of a principal axis, etc.).

In variants, the subregions can be determined (and/or the method can be used) when a historical grasp success rate associated with an object, object face, object component, object segment, or other portion of the object has less than a threshold performance (e.g., performance of the method without subdividing the face and using every keypoint of the face; less than: 99%, 95%, 90%, 75%, 50% grasp success rate, etc.). In such variants, a single face of an object or multiple (e.g., every) face can be subdivided into subregions (e.g., such as for objects with complex geometric faces/features). In one example, the method is applied to a first face of the object that has less than a threshold grasp success rate, and not applied to a second face of the object that has at least the threshold grasp success rate (e.g., the first face—and corresponding keypoints—are subdivided, while the second face—and corresponding keypoints—are not).

The subregions can be defined: manually, automatically, by learning subregions, estimated from object geometry (e.g., sharp surface gradient or geometry changes define boundaries between subregions), randomly and/or otherwise defined. The subregions can be defined based on (e.g., bounded by) object ridges, object seams, other object features, positioning relative to an object axis or reference point, or otherwise defined. In a first embodiment, subregions are defined by: determining an object axis (e.g., based on the object's geometric model) and subdividing the object along the object axis into a predetermined number of subregions. In a second embodiment, subregions are defined manually. In a third embodiment, subregions are learned. In a first example, subregions are learned by identifying regions with higher-than-average grasp success rates (e.g., across the object). In a second example, subregions are learned by learning which geometric features have a higher grasp success rate, and identifying similar geometric features in the object model. In an illustrative example, cavities, orifices, or high-curvature surfaces (e.g., edges) can be associated with low historic grasp success, such that subregions can be defined to avoid or exclude such geometric features. In this example, the grasp area or subregion can surround a confined region (e.g., the region to avoid, the region with a lower-than threshold grasp success probability, etc.). In a specific example, when the object defines difficult-to-grasp geometries, the subregions can be defined such that the union of the subregions defines a grasp area smaller than an area of a convex hull (e.g., defined by the keypoints for said object component or face), since it excludes the difficult-to-grasp region. However, subregions can be otherwise defined.

Subdividing the keypoints functions to assign each detected keypoint to a keypoint subset associated with a given object subregion, such that keypoint subsets can be analyzed independently later on. The subregions for each object (and/or face/side thereof) can be: predetermined; retrieved from a database; determined from the detected keypoints; determined as discussed above; and/or otherwise determined.

A keypoint is preferably included in a single subset, but can alternatively be shared across multiple subsets. Each subset is preferably associated with a single subregion, but can alternatively be associated with (e.g., include keypoints located within) multiple subregions. Each object is preferably associated with multiple subregions, but can alternatively be associated with a single subregion (e.g., the subregion with the highest graspability score, as determined in S300). In the latter variant, S200 can include masking out all keypoints that are not associated with the single subregion, or be otherwise performed.

The subdivided keypoints are preferably the unoccluded keypoints (e.g., wherein the occluded keypoints, determined based on the respective occlusion scores, can be discarded, downweighted, or otherwise managed) and/or unoccluded portions of the object face, but can additionally or alternatively include the occluded keypoints. In a first example, subsets of keypoints can be formed for each subregion associated with a visible or unoccluded face/side of the object. In a second example, a subset can be formed for each subregion associated with an object, which includes far-side/undetected subsets of keypoints (which can be blacklisted or removed by de-weighting via grasp probability score, an occlusion score, etc.).

In a first variant, each keypoint is pre-associated with a given subregion (e.g., before runtime). In this variant, the subsets of keypoints can be formed by grouping keypoints that correspond to each respective subregion. In a first example, the subregion associated with a keypoint is determined from a lookup table. In a second example, a mask for each subregion is applied to the detected object (e.g., aligned with the detected object instance based on an object reference features, such as a visual queue or principal axis), wherein keypoints overlapping the subregion's mask can be assigned to the subregion's subset (or excluded from the subregion's subset if the mask identifies non-subregion regions). However, the keypoints can be otherwise grouped. This variant can be particularly useful when the subregions are predefined, and/or when a graspability score is determined based on a predetermined and/or learned grasp probability score for each (predefined) subregion, but can be used with other variants.

In a second variant, each keypoint is dynamically associated with a subregion during runtime. In this variant, the subregions can also be dynamically determined, or be predetermined. For example, unoccluded keypoints (e.g., for an object) can be detected by the object detector (e.g., in S100), the subregions (e.g., for the object) can be dynamically determined based on the region encompassed by the unoccluded keypoints (e.g., by subdividing the region according to a predetermined set of rules, such as a predetermined number of subregions, subregions having a predetermined size, subregions having a predetermined set of shapes, etc.), and the keypoints overlapping each subregion (e.g., falling within the subregion) can be assigned to the respective subregion. However, the keypoints can be otherwise associated with the subregions.

Subsets preferably include at least three keypoints, however can include any suitable number of keypoints (e.g., one, three, more than three, etc.). However, subsets can be otherwise suitably defined.

Keypoints preferably correspond to virtual points associated with subregions, such as virtual points which lie within the boundary of the subregion or a planar projection thereof (e.g., when projected into an image coordinate frame), along the boundary of the subregion, and/or proximal to a visual feature or pattern associated with the subregion (e.g., barcode, fiducial, logo, etc.). However, keypoints can have any other suitable correspondence to subregions.

In variants, subdividing the set of keypoints into subsets can optionally include: determining a visible face (or side) of the object per detected object using the keypoints and/or a corresponding occlusion score(s); and subdividing the set of keypoints into subregions corresponding to the most visible face using the grasp probability scores associated with each subregion. Selecting the visible face can function to select the most visible faces per detected object. In a first variant, when each object face of the object is associated with an occlusion score, the object face with the minimum occlusion score can be selected as the visible face. In a second variant, when the occlusion score is generated per keypoint, the occlusion scores per keypoint of an object face can be combined (e.g., summed, multiplied, etc.) to determine an occlusion score per object face. The object face associated with the minimum occlusion score can be selected as the visible face. In a third variant, the keypoints and keypoint identifiers can be used to determine a set of object faces and the visible face can be selected from the set of object faces (e.g., at random; based on the number of keypoints per object face, such as the most keypoints; etc.). In a fourth variant, the object face with the keypoint with the lowest occlusion score is selected.

However, keypoints can be otherwise suitably subdivided based on the subregions.

Determining a graspability score for the subregion S300 can function to determine a likelihood of success for grasping an object within the subregion (e.g., at the grasp location or another location). S300 is preferably performed once for the object, but can alternatively be periodically performed for the object, performed for each detected object instance in the scene, a single object instance detected in the scene, and/or for any other suitable set of objects. The graspability score can be used to determine the grasp location, rank/order for grasp locations, determine a weight for each grasp location, and/or can be otherwise used. The graspability score can be a number between 0-100, 0-10, 0-1, and/or a number in any other range, a percentage, and/or any other suitable score. The grasp locations can be from S300 and/or from any other suitable method.

Figure 3:
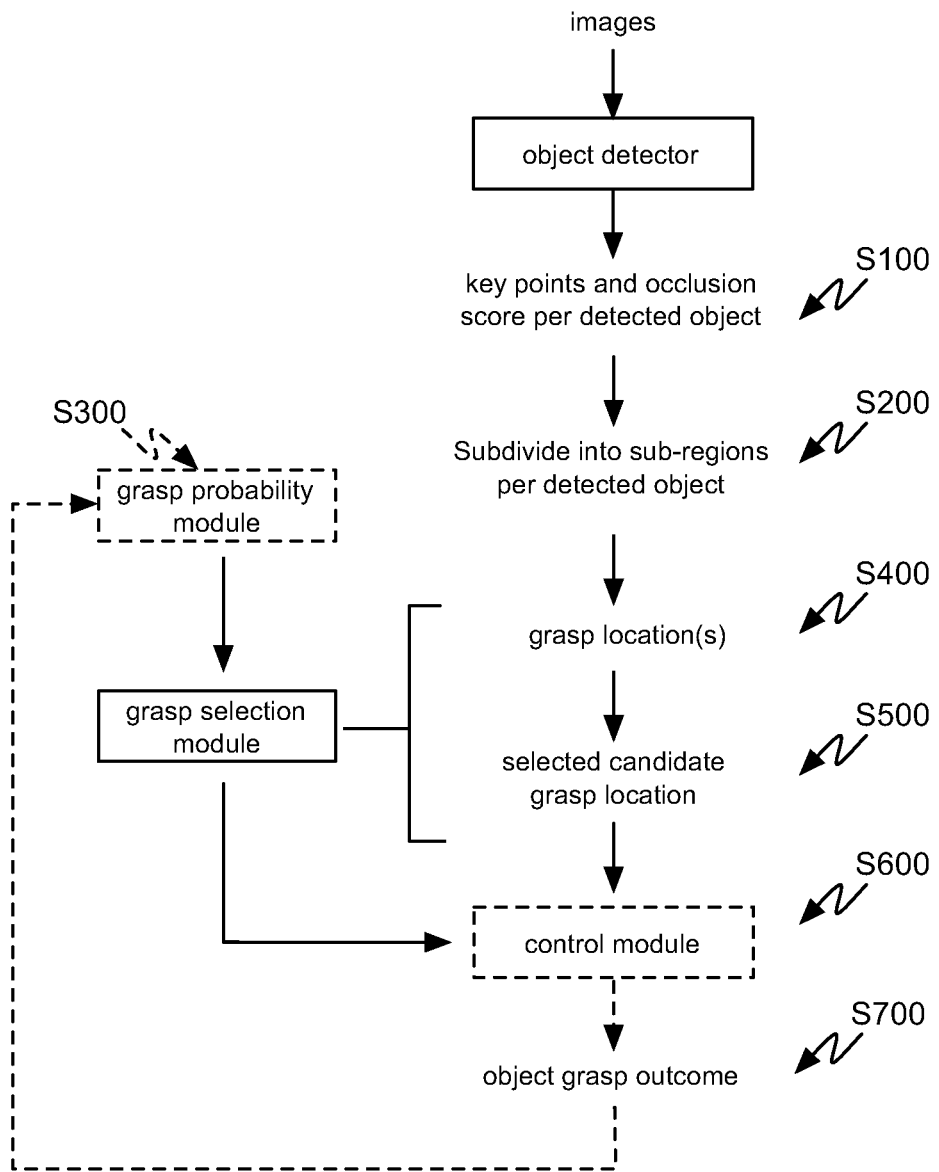
FIG. 3 is a flow chart diagram of a variant of the method.

A graspability score is preferably determined for each subregion (e.g., at the grasp location, example shown in FIG. 3), but can additionally or alternatively be determined for each subset of keypoints, for each face, and/or for each object, however any other suitable graspability scores can be determined.

The graspability score can be determined based on empirical grasping data (e.g., the outcomes of a plurality of grasp attempts at the subregion), a combination (e.g., multiplication, addition, subtraction, etc.) of one or more parameters, based on a rule set, based on a predetermined equation, looked up, or otherwise determined. The graspability score can be determined based on: a grasp probability score, an object (or keypoint) detection score (e.g., detected or not), the occlusion score, the candidate grasp location's corresponding 3D location (e.g., height of the 3D grasp location), proximity to the edge of a scene, proximity to edge of the object, grasp location's associated surface normal, whether the depths within a predetermined radius of the candidate grasp location are within a predetermined range of the grasp location's depth (e.g., the surface planarity), and/or any other suitable parameter. The parameters can be weighted (e.g., giving more weight to one or more parameters over other parameters) or unweighted.

Determining the graspability score can include determining a grasp probability score for the subregion S300, which functions enable selection of a candidate grasp location based on a relative likelihood of grasp success. The grasp probability score can represent the likelihood of success for grasping the object in the subregion at a grasp location and/or at a random location within the subregion, or at any other suitable location within the subregion. The grasp probability score can be determined from empirical grasping data, using a lookup table or database query per object component (e.g., object face, object subregion, object keypoints, etc.), using a model (e.g., based on the subregion's detected keypoints and associated occlusion scores), and/or otherwise determined. In one example, the grasp probability score is determined by a neural network that is trained to determine the grasp probability score for a subregion based on the object geometry. The grasp probability score can be a value between 0-1, 0-10, 0-100, and/or any other suitable value. The grasp probability score can be predefined or not predefined. In variants, the grasp probability score can be periodically updated based on grasp outcomes (e.g., such as in S700, examples are shown in FIGS. 6A-B and FIG. 7A-F) or not updated. However, the grasp probability score can be otherwise determined.

In variants, the graspability score and/or one or more parameters thereof can be determined prior to determining a grasp location (e.g., based on the image and detected objects/keypoints or subsets thereof) and/or can be used as inputs for determining the grasp location for one or more subregions. Additionally or alternatively, the graspability score for a subregion and/or one or more parameters thereof can be determined based on the grasp location (e.g., after S400) for a particular subregion.

In a first variant, S300 (or a sub-element thereof) is performed before inference and/or runtime. In this variant, the grasp probability score for each subregion is predetermined, wherein the grasp locations for each subregion (determined in S400) can be weighted, retained, and/or removed to calculate the graspability score based on the subregion's grasp probability. The subregion's grasp probability score is preferably determined based on empirical grasping data (e.g., historical success/failure of grasps within the given subregion; success rate for the given subregion; etc.) but can be otherwise determined. In a first embodiment, each subregion can be independently targeted for grasping, wherein each subregion's grasp probability score is determined based on the respective success/failure rate. In a second embodiment, grasps are attempted across the entirety of the object (and/or a portion thereof), wherein the attempted grasp locations are subdivided by subregion, wherein each subregion's grasp probability score is calculated from the subregion's attempted grasp success/failure rate. However, the predetermined grasp probability score can be otherwise determined.

In a second variant, S300 is performed during inference and/or runtime. In this variant, the graspability score can be determined based on a set of heuristics, scene features or characteristics, or otherwise determined. For example, the graspability score can be calculated based on whether a keypoint or grasp location: is within a predetermined distance of an object container; associated with grasp pose outside of a predetermined angular range from vertical; deeper than a predetermined depth; and/or otherwise determined. In a specific example, the graspability score can be determined using the method disclosed in U.S. application Ser. No. 17/375,424, titled "METHOD AND SYSTEM FOR OBJECT GRASPING" and filed 14 Jul. 2021, which is incorporated herein in its entirety by this reference. Graspability scores determined using this variant can optionally be used as candidacy scores. The graspability score can be specific to a candidate grasp location, and is preferably different from and/or determined based on the grasp probability score for the subregion (e.g., that the candidate grasp location is located within). However, the graspability score can be the same as the grasp probability score.

In a first embodiment of the second variant, the graspability score can be determined for each keypoint (each keypoint determined in S100, each non-occluded keypoint, etc.). The graspability score can be determined based on: historical grasp success at the keypoint (e.g., for the object in different poses; a grasp probability score associated with the keypoint); a predetermined score for the keypoint; using a neural network (e.g., based on the keypoint's proximity to other objects or edges, the object detector, etc.); the keypoint's occlusion; and/or other parameters. For example, a grasp probability and/or detection probability can be determined for each keypoint in a subregion, which can be used to determine the grasp location for the subregion.

In a second embodiment of the second variant, the graspability score can be determined for the subregion of each detection (e.g., each subregion of a detected object, each nonoccluded subregion). The subregion's graspability score can be determined based on: the graspability score for the keypoints within the subregion (e.g., the maximum graspability score of a keypoint within the subregion), the graspability score for the unoccluded keypoints in the region, the unoccluded portion of the subregion, the historical grasp success rate for the subregion, and/or otherwise determined.

In a third embodiment of the second variant, the graspability score can be determined for each grasp location (determined in S400). The grasp location's graspability score can be determined based on: the graspability score for the keypoints used to determine the grasp location, the unoccluded portion of the subregion, the historical grasp success rate for the subregion, and/or otherwise determined.

In one example, determining the graspability score for a grasp location of a subregion can include determining a corresponding 3D location. Determining the corresponding 3D location can include: mapping the grasp location to a 3D space, which can function to map a 2D grasp location to a 3D grasp location. In one variation, the depth information associated with the 2D grasp location (e.g., the depth information for the pixel associated with the 2D grasp location) can be used to determine the 3D grasp point. However, the grasp location can be otherwise mapped to a 3D grasp location.

In variants, the method can include both the first and second variant of S300, wherein the first variant is used to determine which subregions of the object to prefer for grasping, and the second variant is used to select a candidate grasp location from the set of grasp locations determined for the set of objects detected in the scene. However, only a single variant can be used, or other variants used.

In a first embodiment of S300, the graspability score for a subregion is calculated using a predetermined equation, wherein the variable weights can be empirically determined. The equation variables can include the parameters discussed above (e.g., wherein subjective or descriptive parameters can be converted to numerical values) or be other variables.

In a second embodiment of S300, the graspability score is determined using a set of parameters, wherein different parameter values can include, exclude, and/or adjust the graspability score of a given grasp location.

In a third embodiment of S300, the graspability score is determined using the grasp selection module, wherein a model of the grasp selection module can be trained based on: the grasp location, the image, the selected subregion, the detected keypoints (e.g., of the subregion), the associated occlusion scores (e.g., which can be binary), the history of grasp attempt successes for the grasp location, and/or other information.

In a fourth variation of S300, the graspability score is determined based on historical grasp successes and/or failures at the subregion (e.g., a grasp probability score for the subregion), keypoint, grasp location, and/or other data object.

However, the graspability score can be otherwise determined.

Determining a grasp location for a subregion S400 can function to determine where to grasp the object. S400 can be repeated for all detected objects in the scene, a single object, and/or any other suitable set of objects.

S400 can be repeated for all subregions of each detected object instance, for all unoccluded subregions of each detected object instance, for the subregion with the highest graspability score, or for any other suitable set of subregions. In one example, S400 is performed for only the top-scored subregion of the object (e.g., of the object model). In a specific example, S400 is not performed for detected objects where the highest-scoring subregion is occluded. In a second example, the highest-scoring subregion is selected from the unoccluded subregions of each detected object, and S400 is performed for said highest-scoring subregion.

The grasp location can be a grasp point (e.g., in a 2D image coordinate frame, in a 3D coordinate frame, etc.), a grasp position along an axis of the object, the location of a pixel within the image (or a group of pixels), and/or any other suitable location. The grasp location can be a number, a set of numbers (coordinates), and/or otherwise represented. The grasp location can be 2D or 3D. The grasp location determination method can be generic, selected based on the end effector, and/or otherwise determined.

The grasp location is preferably determined based on the keypoint subset associated with the subregion, but can be determined based on other keypoints or otherwise determined. The grasp location can be determined based on: the keypoints themselves, a convex hull determined from the keypoints (e.g., in 3D or 2D space), a boundary enclosing the keypoints, object features detected with or inferred from the keypoints (e.g., principal axis, minor axis, pose, etc.), and/or any other suitable derivative construct. A grasp location can be determined for: the object subregion with the highest grasp probability score (and/or highest graspability score), all object subregions, all unoccluded subregions, a selected subregion, and/or any other suitable set of subregions. One or more grasp locations can be determined for each object instance detected in the scene.

In variants, determining a grasp location can include determining the central point (e.g., 2D or 3D) of the subregion. In a first variant, the central point of the subregion is predetermined from the object model, and retrieved from a database based on the subregion identifier. In this variant, the keypoints can be used to determine whether the subregion is visible (e.g., unoccluded), and can optionally be used to determine whether the central point of the subregion is unoccluded. In a second variant, the central point of the subregion is calculated from the locations of the detected keypoints associated with the subregion. The detected keypoints used in the calculation are preferably unoccluded keypoints, but can additionally or alternatively include occluded keypoints. The central point can be: the mean (e.g., absolute mean), weighted mean (e.g., based on predetermined weights assigned to each keypoint identifier; weights assigned based on the keypoint occlusion score; etc.), geometric center, volumetric center, mass center, projected center, median keypoint, mean of the convex hull defined by the keypoint subset, and/or another point determined based on the subregion's detected keypoints. In variants, the central point can be determined based on a weight associated with each keypoint, such as weighted based on the occlusion score (e.g., binary for each keypoint—such as to mask/remove occluded keypoint from consideration; occlusion score associated with the keypoint, face, object, etc.), detection probability, grasp probability score (e.g., for the subregion that the keypoint is located within, the historical grasp success rate for the keypoint, the historical grasp success rate of a subregion, etc.), and/or otherwise weighted. In variants, the central point can be determined based on the geometry of the end effector, such as a central point having a maximum root-mean-squared (RMS) distance from an inscribed circle (or other end effector geometry/footprint) to a polygon connecting keypoints of the subset (or a smaller subset thereof).

In a second variant, determining a grasp location can include calculating a principal component axis for an object based on the keypoints and selecting a point within the selected subregion along the principal component axis (PCA) as the grasp location (e.g., for the end effector to grab on either side of the principal component axis). The point can be: the PCA center, the center of the visible portion of the PCA, a point along the PCA that is closest to the weighted mean of the detected keypoints of the selected subregion, and/or any other point along the PCA.

In a third variant, the grasp location can be determined by computing the convex mean or center of a convex hull for the subset of keypoints associated with the subregion.

However, the grasp location of the subregion can be otherwise determined.

Selecting a candidate grasp location S500 can function to select a grasp location that is most likely to result in a grasp success. The candidate grasp location is preferably the grasp location corresponding to the highest graspability score (e.g., for a detected object and/or a virtual subregion associated therewith), but can alternatively be the grasp location with the lowest graspability score, the grasp location with the highest candidacy score (e.g., calculated based on a set of heuristics), or any other suitable score.

S500 is preferably performed once per scene or image, but can alternatively be performed once per object, multiple times for each scene, image, or object, or otherwise performed. The candidate grasp location can be selected for an individual object (a single candidate grasp location can be determined for each object in the scene) or for an individual image/scene (a single candidate grasp location can be selected for a plurality of detected objects); however an object or image/scene can alternatively be associated with multiple candidate grasp locations. The candidate grasp location is preferably selected from the resultant set of grasp locations generated by S400 (e.g., at least one for each of a set or subset of detected objects), but can additionally or alternatively be selected from a set of grasp locations generated using other methods (e.g., such as that discussed in U.S. application Ser. No. 17/375,424, titled "METHOD AND SYSTEM FOR OBJECT GRASPING," or other methods).

In a first variant, selecting a candidate grasp location based on the graspability scores can include ranking the grasp locations based on the respective graspability score (e.g., determined according to S300, such as by using the second variant); and selecting the grasp location with the highest graspability score. Additionally or alternatively, multiple 3D grasp locations (e.g., up to the top 3, up to the top 5, up to the top 10, up to the top 15, up to the top 20, etc.) can be selected (e.g., to perform sequential grasps when a first candidate grasp fails).

In a second variant, selecting a candidate grasp location can include generating a group of candidate grasp locations by filtering grasp locations with a graspability score below a threshold from consideration (e.g., below 0.4, below 0.5, below 0.6, below 0.7, etc.); and randomly selecting a 3D grasp location from the group.

The candidate grasp location is preferably selected using the graspability score, but can be otherwise selected. In a first variant, the subregion with the highest graspability score can be selected. In a second variant, when multiple graspability scores are the same for different subregions, the subregion can be selected randomly from the set of subregions with the same graspability score. In a third variant, subregions are assigned a weight based on their graspability score, wherein the weight can be a value from 0-1, 0-10, 0-100, and/or any other suitable value. The weight can be proportional to the score, can be the score, and/or otherwise determined.

The candidate grasp location is preferably selected within a 2D reference frame (e.g., 2D image reference frame) and subsequently mapped to a 3D reference frame for use in S600 (e.g., 3D cartesian coordinates, joint space, etc.; such as by using a depth mask for the image). However, the candidate grasp location can additionally or alternatively be selected in any suitable coordinate frame(s) and/or transformed into any suitable coordinate frames.

However, a candidate grasp location can be otherwise selected.

Optionally grasping an object using the candidate grasp location S600 can function to grasp an object at the candidate grasp location. S600 can be performed by the robot arm and the end effector (e.g., using direct execution; closed loop visual servoing, such as iteratively improving feature location based on better centered and more close up images until grasp success; etc.) and/or any other suitable system.

Grasping the object can include calculating a trajectory by performing motion planning (e.g., from a current end effector position to the candidate grasp location). Motion planning is preferably performed by the computing system, but can additionally or alternatively be performed by any other suitable system. Grasping the object can optionally include determining a next trajectory for a next candidate grasp location while grasping the object at the candidate grasp location. The next candidate grasp location can be the grasp location of a different object with the next best final score, randomly selected, and/or otherwise determined. If the candidate grasp proposal fails (e.g., the force of the end effector is greater than a force threshold, the end effector travelled further than the object depth, etc.), a next candidate grasp location (e.g., from S500, such as the grasp location with a next highest final score, or chosen at random from a group of selected grasp locations) can be executed. Next candidate grasp locations can be executed until grasp success (e.g., the end effector grasps an object) or a set of candidate grasp locations is empty.

In variants, grasping the object can be performed as described in U.S. application Ser. No. 17/375,798, titled "METHOD AND SYSTEM FOR GRASPING AN OBJECT", filed 14 Jul. 2021, and/or as described by U.S. application Ser. No. 17/375,424, titled "METHOD AND SYSTEM FOR OBJECT GRASPING" filed 14 Jul. 2021, which are incorporated herein in their entireties by this reference.

However, the object can be otherwise grasped.

Optionally updating the grasp probability score for the candidate grasp location (and/or the corresponding subregion) based on the grasp outcome (e.g., grasp success or failure; success or failure of object insertion at a placement location, etc.) S700 can function to update the grasp probability scores to optimize for grasp success. S700 is preferably performed during a training session and/or after S700 (e.g., after a grasp attempt), but can additionally or alternatively performed at any other suitable time.

In a first variant, each possible grasp location with a number of successes and a number of failures that are combined to calculate the grasp probability score, wherein updating the grasp probability score includes adding 1 to the count of either the grasp success or grasp failure and re-calculating the grasp probability score.

In a second variant, updating the grasp probability score can include increasing or decreasing the grasp probability score by a value associated with the grasp outcome (e.g., increase the score after a grasp success, decrease the score after a grasp failure, etc.).

In a third variant, updating the grasp probability score can include training the grasp probability module based on images, depth information, occlusion score(s), keypoints, and/or any other suitable information.

However, the grasp probability score can be otherwise updated.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising:
   receiving an image of a scene comprising a plurality of visible objects;
   using an object detector, generating a set of keypoints for an exposed portion of a visible object in the scene, wherein each keypoint defines a position within a coordinate frame of the image;
   subdividing each set of keypoints into subsets, wherein each subset corresponds to a predetermined subregion of the visible object;
   determining a grasp location for each subset based on the positions of the respective keypoints;
   selecting, from a resultant set of grasp locations, a candidate grasp location for the visible object based on a grasp probability score associated with the respective subregion; and
   facilitating grasp execution based on the candidate grasp location.

2. The method of claim 1, wherein the subregions are determined when a historical grasp success rate associated with the exposed portion has less than a threshold performance.

3. The method of claim 2, wherein the historical grasp success rate is associated with every keypoint generated for the exposed portion.

4. The method of claim 1, wherein the grasp probability score is determined using a trained neural network which is generated from a set of training data which includes subsets of training keypoints corresponding to a respective predetermined subregion and a grasp outcome for a corresponding grasp location.

5. The method of claim 1, further comprising updating the grasp probability score of the subregion associated with the first candidate object grasp location based on a grasp outcome.

6. The method of claim 1, further comprising: generating a second set of keypoints for a second visible object in the scene using the object detector, and determining a second candidate object grasp location for the second visible object, wherein the resultant set of grasp locations comprise the candidate grasp location and the second candidate grasp location.

7. The method of claim 1, wherein the grasp location comprises a central position of the positions of each keypoint corresponding to the respective subregion.

8. The method of claim 7, wherein the central position is a weighted average calculated based on a detection probability of each keypoint received from the object detector.

9. The method of claim 1, wherein the coordinate frame of the image is 2D and each grasp location is 2D.

10. The method of claim 9, wherein the keypoints are generated in 3D by the object detector.

11. The method of claim 9, wherein the grasp is executed based on an image depth at the candidate grasp location.

12. The method of claim 1, wherein the subregions are symmetric relative to a principal axis of the object.

13. The method of claim 1, wherein the set of keypoints defines a convex hull in the coordinate frame of the image, wherein a union of the predetermined subregions defines a grasp area which is smaller than an area of the convex hull.

14. The method of claim 13, wherein the grasp area surrounds a confined region associated with a grasp probability which is less than a predetermined threshold.

15. The method of claim 14, wherein the confined region spans at least of: an orifice, a cavity, or an edge.

16. A method comprising:
    generating a keypoint set for each object depicted within an image of a scene comprising a plurality of objects;
    subdividing each keypoint set into regional subsets, wherein each regional subset corresponds to a predetermined subregion of the respective object;
    determining a grasp location for each regional subset based on positions of the respective keypoints;
    selecting a grasp location, from a resultant set of grasp locations, based on the associated subregion; and
    facilitating grasp execution based on the selected grasp location.

17. The method of claim 16, wherein the subregions are determined based on an object geometry.

18. The method of claim 17, wherein the subregions comprise equal segments aligned along a principal axis of the object.

19. The method of claim 17, wherein the subregions comprise non-concave regions of the object.

20. The method of claim 16, wherein the subregions are determined when a grasp success rate for grasp locations, determined based on entire keypoint sets, falls below a threshold.

21. The method of claim 16, further comprising: based on the set of keypoints, determining an occlusion score associated with each regional subset, wherein the grasp location for each regional subset is further determined based on the occlusion score.

22. The method of claim 21, wherein the occlusion score is a keypoint occlusion score, the method further comprising: determining a keypoint occlusion score for each keypoint of the set, wherein the grasp location for each predetermined subregion is determined based on unoccluded keypoints within the respective regional subset.

* * * * *